United States Patent [19]

Kilb

[11] Patent Number: 5,789,096
[45] Date of Patent: Aug. 4, 1998

[54] GAS-TIGHT ALKALINE ACCUMULATOR WITH VALVE ASSEMBLY

[75] Inventor: Manfred Kilb, Frankfurt am Main, Germany

[73] Assignee: Christoph Emmerich GmbH & Co. KG, Frankfurt, Germany

[21] Appl. No.: 586,763

[22] PCT Filed: Jul. 16, 1994

[86] PCT No.: PCT/DE94/00835

§ 371 Date: Apr. 15, 1996

§ 102(e) Date: Apr. 15, 1996

[87] PCT Pub. No.: WO95/04381

PCT Pub. Date: Feb. 9, 1995

[30] Foreign Application Priority Data

Jul. 29, 1993 [DE] Germany .......... 43 25 464.0

[51] Int. Cl.[6] .................................. H01M 10/02
[52] U.S. Cl. .......................... 429/53; 429/54; 429/59
[58] Field of Search ........................ 429/53, 54, 56, 429/57, 64

[56] References Cited

U.S. PATENT DOCUMENTS 4,532,705  8/1985  Zupanic et al. ............... 29/623.2
4,745,039  5/1988  Yoshinaka ...................... 429/54
5,080,983  1/1992  Alexon et al. .................. 429/54
5,171,647  12/1992  Dean et al. ..................... 429/54

FOREIGN PATENT DOCUMENTS

0 306 146  3/1987  European Pat. Off. .

*Primary Examiner*—M. Nuzzolillo

[57] ABSTRACT

In a gas-tight alkaline accumulator with a casing which at least partially comprises plastic material and in which are arranged electrodes which are surrounded by an electrolyte and which are respectively separated from each other by a separator, wherein the electrodes are connected to pole contacts for electric current to be fed to and away therefrom, in order to increase the operating reliability of the accumulator and to avoid further disadvantages, there is provided a valve having an opening which passes through the casing of the accumulator, and a deformable element which, in the event of an increased pressure occurring within the casing, provides for liberation of the opening and, after a drop in the increased pressure, closing of the opening.

22 Claims, 6 Drawing Sheets

GAS-TIGHT ALKALINE ACCUMULATOR WITH VALVE ASSEMBLY

BACKGROUND OF THE INVENTION

1. Field of the Invention

The invention concerns a gas-tight alkaline accumulator.

2. Discussion of Prior Art

The requirements made in respect of accumulators of that kind are progressively rising, in the field of electronics. Continuously increasing mobility and rising demands in regard to operating comfort are compelling the development of ever more powerful, lighter and smaller energy sources. Thus for example hand-held mobile telephones such as the present-day D-network or future E-network telephones are admittedly becoming smaller and smaller and lighter and lighter, but, in order to be able to achieve market successes at all, they must ensure minimum times in respect of operational readiness, which are usually in the range of several hours.

In regard to the development of integrated circuits and very large-scale integrated chip sets for mobile telephones of that kind or other portable equipment such as for example lap-tops or palm-tops (portable computers), camcorders and hearing aids, enormous sums are spent on miniaturising the electronic circuit assemblies, but corresponding small energy sources are also required.

With the development of prismatic casings of plastics material for gas-tight alkaline accumulators, it has already been possible to achieve considerable success in terms of improving those accumulator properties. The use of a light plastic material casing and adaptation of the casing to the geometries which are predetermined by the respective equipment manufacturer or adaptation to wide-spread rectangular casing configurations provide for light accumulators with a high storage density. With adapted electrode shapes, it is possible to use almost the entire remaining volume of the equipment for the storage of electrical charge; reference is directed in this respect to German patent application No P 43 25 464, the disclosed content of which is completely incorporated herein by reference thereto and made the content of the present application.

However, it is precisely in the case of light and small accumulators that a high degree of attention must be paid to the prevention of bursting, in order to avoid unnecessarily losing the advantages attained, by virtue of an additional thickness of material or a more expensive casing structure. In the event of overcharging or charging with excessively high currents, and also after polarity reversal or a short-circuit, high increased pressures may occur in the interior of the casing, and such pressures can ultimately result in bursting of such cells.

Although glass or carbon fibre-reinforced plastic materials have high levels of strength and impact toughness, bursting of the accumulator must be certain to be excluded at any time. Particularly in the case of hand-held items of equipment, the explosive escape of the strongly alkaline and corrosive electrolyte can result in injury to persons and/or damage to expensive items of equipment.

In the case of larger accumulators, to control the increased pressures and the safety risks involved therewith, use is made of screw-in pressure-relief valves which however cannot be used in the case of small gas-tight alkaline accumulators, because of the additional amount of space required for the screwthread and the valve unit which is generally of an expensive construction.

The desired-rupture locations which are known in the field of gas-tight alkaline accumulators with a metal casing are also disadvantageous in regard to damage to high-quality equipment in the event of continuing discharge of the electrolyte. After the desired-rupture location has opened, it continues to result in a loss of sealing integrity of the accumulator casing, and that can therefore involve the undesired discharge of further electrolyte.

SUMMARY OF THE INVENTION

Tests have further shown that such desired-rupture locations used in connection with metal casings cannot be directly transferred to plastic casings. Metal casings, in particular of round cells, can in part withstand pressures of 20 bars and higher, but, at increased pressures of such a high magnitude, prismatic and in particular rectangular plastic casings may suffer from bulging effects which disturb their dimensional accuracy and which are therefore to be avoided.

The concepts developed in connection with lead-acid accumulators also generally cannot be applied to small alkaline gas-tight accumulators with a high power density. Lead-acid accumulators generally have substantially more space, and neither the weight nor the form of additional valves play an essential part.

EP-A1-0 049 081 discloses an electrochemical cell with a valve arranged in the pole contact. By virtue of the valve being arranged in the pole contact, it is possible that the volume required for the valve is not occupied within the cell, so that the loss in volume which reduces the storage capacity can be avoided. A disadvantage with that arrangement however is that the escape of electrolyte which is caused by an increased pressure can contaminate the pole contacts and consequently even damage then.

EP-A1-0 306 146 discloses a valve structural group which is less designed for reducing an increased pressure, but which is rather intended for venting a battery chamber. The cylindrical valve elements shown therein surround the valve seat in a curtain-like fashion with only a light contact pressure. Although in that way it is possible to produce high flow volumes by virtue of the sealing element being set back to afford a large space, the sealing capability is inadequate at high pressures as occur for example in gas-tight alkaline accumulators. Because of the small gas volumes remaining, the escape of very small amounts is generally sufficient in alkaline accumulators, to provide for a considerable reduction in pressure.

The object of the present invention is therefore that of increasing the operational reliability and safety of an accumulator and at the same time eliminating or at least alleviating the above-discussed disadvantages.

That problem is solved by an accumulator having a casing which at least partially is made of plastic material and in which are arranged electrodes, an electrode separator, and electrolyte surrounding the electrodes. Pole contacts are connected to the electrodes for feeding electric current to and away from the electrodes. A valve for reducing increased pressure occurring in said accumulator has an opening that leads through the casing and a deformable element arranged to provide liberation of the opening in the event an increased pressure occurs within the casing and for closing the opening after the increased pressure falls. A predeterminable increased pressure for opening the valve is produced by a defined upsetting of the deformable element.

In the event of an increased pressure occurring in the cell, the deformable element provides for opening and immediate re-closing after the increased pressure has been reduced so that gas is discharged only for a short period of time and only very small amounts of gas or entrained electrolyte constituents are discharged. In that way the capacity of the accumulator is adversely affected only to a slight degree, even if at all.

If, by virtue of its own elasticity, the deformable element bears in forcible sealing contact against the opening of the accumulator casing, both liberation of the opening in the event of an increased pressure and also the sealing effect in the normal operating condition are achieved by virtue of a single elastic deformable element. The two functions require only one component, so that the valve assembly is simple to produce, while occupying a small amount of space. Losses of volume remain low, and a suitable arrangement of the valve assembly, which is described in greater detail hereinafter, can avoid losses of capacity.

If the deformable element is supported at the side which is opposite to the opening, and if therefore it is subjected to a defined upsetting effect, a predeterminable increased pressure value can be produced, for opening the valve. With the modulus of elasticity being known, the upsetting effect of the deformable element, together with the known area of the opening within the accumulator casing, can be easily calculated, taking the predetermined increased pressure value as the basic starting point. In addition various values in respect of the increased pressure can be easily achieved, for example for different accumulator designs, merely by virtue of the selection of the length of the deformable element.

In the case of rectangular accumulators in the range of sizes of about 17 mm×6 mm×48 mm, it was possible for the increased pressure, as from which the valve opened, to be easily reproducibly adjusted at between 2.5 and 10 bars. It is however also possible to achieve any other increased pressure values. An increased pressure of 3.5 bars or 4.5 bars was found to be desirable in regard to avoiding the above-described disadvantages.

If there is arranged adjacent the deformable element a discharge passage which extends within a wall beside the deformable element, that arrangement, in spite of the small size of the discharge passage, already affords a labyrinth arrangement for escaping gases and for entrained constituents of the electrolyte. The reduction in pressure takes place in a more regular manner as the discharge passage, with its cross-section, produces the defined gas discharge effect, and discharging gas components are already decelerated within the discharge passage. Forming the discharge passage within a wall of the chamber of the deformable element is both possible in an inexpensive fashion without involving further structural groups, and simple from the point of view of the production procedure involved.

If the deformable element is arranged with lateral play or clearance within a valve chamber, the clearance between the sealing element and the chamber accommodating it results in a space with a pre-chamber effect, in which case the increased pressure is already relieved within that chamber, and the discharge of gas occurs at a substantially lower pressure, relative to the exterior of the accumulator.

With a retaining element which can be pressed in from the outside, the valve assembly can be produced independently of the remaining accumulator assemblies. When accumulators are otherwise assembled, the deformable element can be subsequently fitted into the valve chamber and the retaining element can be pressed on from the outside. In that way it is possible to use the same accumulators for different increased pressures, which simplifies stockkeeping, and it is also possible to design the accumulators with deformable elements of different lengths, depending on the respective use involved.

If, in an alternative embodiment, the deformable element has a cup-shaped cover cap fitting laterally thereover, and is held in contact bearing against same at its rear side, with the cover cap having a valve discharge opening, that makes it possible to construct a mechanically stable valve assembly of very small dimensions, which is shielded from external influences. The casing is further mechanically strengthened by virtue of the cover cap being welded to the casing, preferably by thermal welding or by ultrasound welding. The additional valve discharge opening in the cover cap enhances the pre-chamber effect and can further reduce the speed of the issuing gases.

If, in a further alternative embodiment, the deformable element is held by a cup-shaped cover cap in bearing contact at the front side thereof, and if in that arrangement the opening in the casing is disposed in the end portion of the cup-shaped cover cap, the valve assembly can only be seen through the discharge opening from the exterior, protected from mechanical influences.

A lateral edge of the cover cap which is of a wider configuration in the outer end region improves the mechanical contact between the cover cap and the casing as the welding effect is improved by larger wall regions which bear against each other. In addition the creep distance for the discharge of gases or electrolyte is increased in length and the sealing properties are improved.

Arranging the valve in the cover of the accumulator makes it possible for the valve assembly to be produced simultaneously with the cover. If the valve is arranged between the pole contacts of the accumulator, that involves a location which is mechanically protected from external influences, and it is possible to use the space between the electrode feed lines, within the accumulator, without losses in capacity. Furthermore the valve body can serve as mechanical centering and/or holding means for the electrode assembly and can secure the position thereof mechanically within the accumulator.

An embodiment which is highly advantageous from the point of view of production procedure involves the hot-in-hot injection welding of a part of the plastic casing with the deformable element. In the hot-in-hot injection welding procedure used, the welded surface forms a mechanically strong hold upon injection of the plastic material of the deformable element along the contact surface, relative to the plastic of the accumulator casing. Preferably then both the at least one part of the casing and also the deformable element comprise a thermoplastic elastomer, in particular a modified polyamide, a styrene-ethylenebutylene-styrene copolymer, and/or a polypropylene. The hard plastic material is so adjusted in respect of its hardness, for example by the addition of plasticisers and/or by the selection of its degree of cross-linking, that it achieves the usual levels of casing strength.

The hardness of the softer plastic material of the deformable element can be so adjusted by the addition of plasticisers and/or by the selection of its degree of cross-linking that it is in the range of known sealing materials.

In a particularly advantageous manner, the deformable element may be hot-in-hot injected simultaneously with the seals of the accumulator casing or simultaneously with the cover seals and/or the pole contact seals.

DESCRIPTION OF THE DRAWINGS

The invention is described in greater detail hereinafter by means of various embodiments and with reference to the accompanying drawings in which.

DETAILED DESCRIPTION OF PREFERRED EMBODIMENTS

Figure 1:
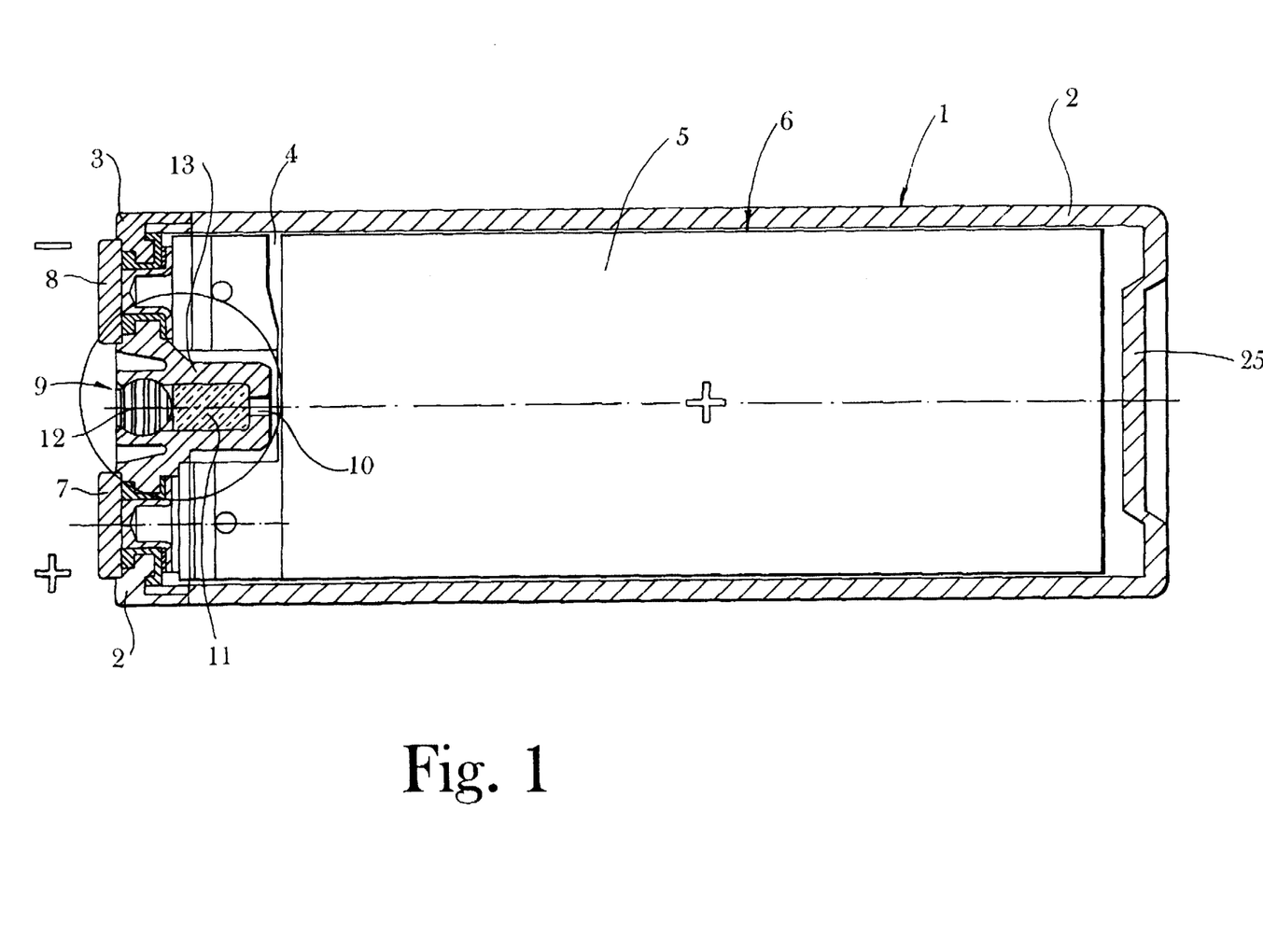
FIG. 1 is a view in section in the longitudinal direction through an accumulator in accordance with a first embodiment according to the invention.

The gas-tight alkaline accumulator shown in FIG. 1, in accordance with a first embodiment of the invention, is generally identified by reference numeral 1 and includes a casing 2 at least partially comprising plastic material, with a cover 3. Arranged within the casing 2 are positive electrodes 5 and negative electrodes 6 which are surrounded by an electrolyte and which are separated from each other by a separator 4. The electrodes 5 and 6 are respectively connected to a positive pole contact and a negative pole contact 8 for electric current to be fed to and away therefrom.

A valve 9 is arranged between the pole contacts 7, 8 in the cover 3 and includes an opening 10 which passes through the casing 2, in particular through the cover 3, of the accumulator 1. A deformable element 11 is held in a valve chamber 13, in a condition of bearing sealingly against the opening 10, being upset by a retaining element 12. When increased pressure occurs within the casing 2, the pressure which bears against the cross-sectional area of the opening 10, as from a predeterminable increased pressure value, causes the deformable element 11 to move back and in that way causes at least partial liberation of the opening 10, whereby gas is discharged and the increased pressure within the casing 2 is reduced. After the increased pressure has been reduced, the deformable element 11 comes into sealing contact with the opening 10, subsequently thereto again, and that causes the discharge of gas to be terminated.

By the choice of suitable materials such as for example rubber or the thermoplastic materials which are described in greater detail hereinafter, the deformable element can be caused to bear forcibly in sealing contact against the opening 10 by virtue of its own elasticity, without further spring elements.

Figure 6:
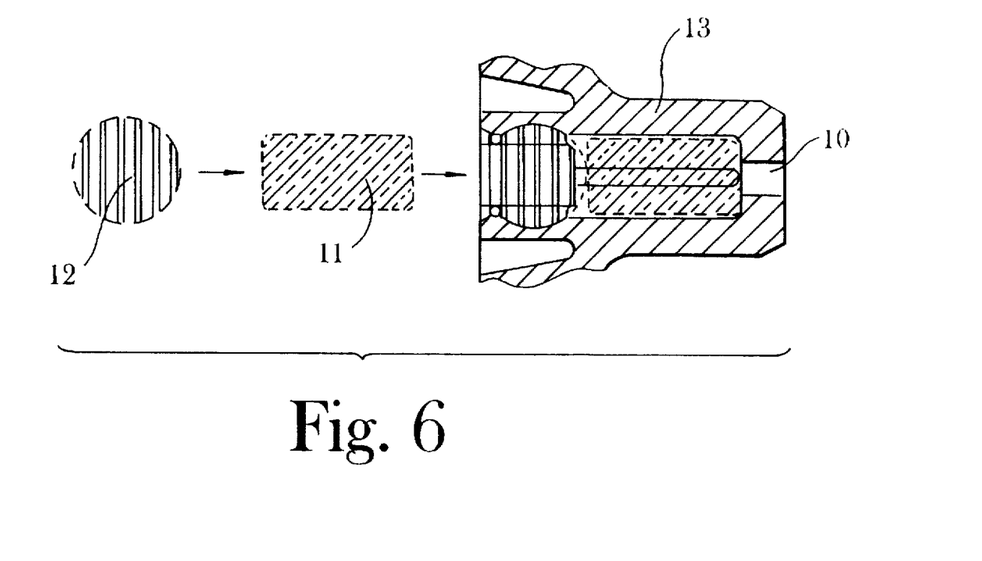
FIG. 6 is a view of the way in which the valve assembly according to the invention in the first embodiment is fitted together.

When the valve assembly is fitted together, as is illustrated in FIG. 6, the retaining element 12 provides for a defined upsetting effect for the deformable element 11, and that upsetting effect can be used to adjust a predetermined increased pressure. The retaining element 12 comprises chemically inert material, in particular the same material as the casing 2. With the modulus of elasticity of the material of the deformable element 11 being known, it is possible to calculate the necessary force for the sealing contact of the deformable element 11 and thus the necessary upsetting effect in respect thereof, from the cross-sectional area of the opening 10 and the predetermined increased pressure for opening same. The increased pressure as form which the valve opens is between 2.5 and 10 bars, preferably being 3.5 or 4.5 bars.

Arranged adjacent the deformable element 11 is a discharge passage 14 which extends within a wall 15 in the valve chamber 13 beside the deformable element 11 from the opening 10 to the exterior of the accumulator 1 or as far as the elastic arms 16, 17.

Figure 2:
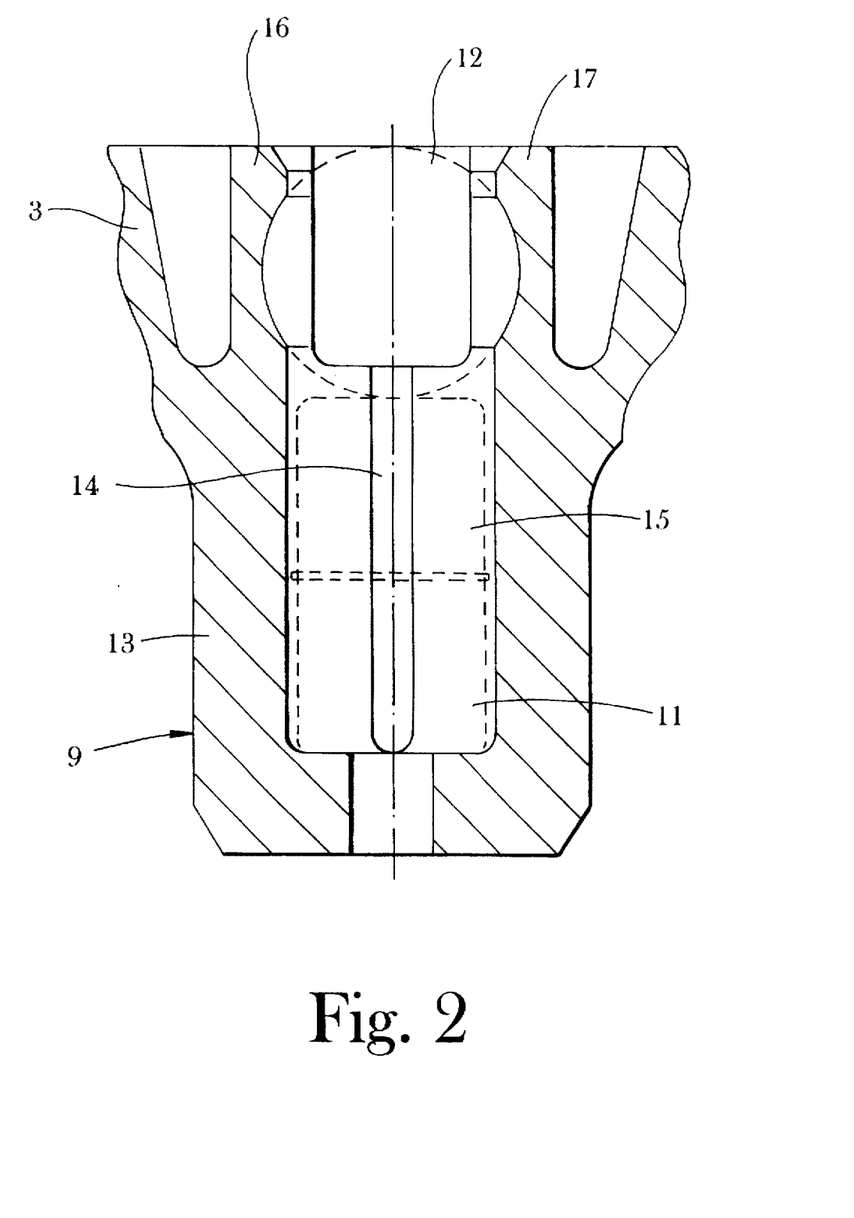
FIG. 2 is a view on an enlarged scale of a part of the valve assembly of the accumulator shown in FIG. 1 without the retaining element and without the deformable element.

The retaining element 12 which is only diagrammatically illustrated in FIG. 2 is securely held by an elastic positively locking connection between the two elastic arms 16, 17 of the casing 2, which adjoin the valve chamber 13 in the longitudinal direction. The deformable element 11 is gripped between the retaining element 12 and the opening 10 in such a way that there remains a lateral play or clearance within the valve chamber 12, even after upsetting of the deformable element 11.

Figure 3:
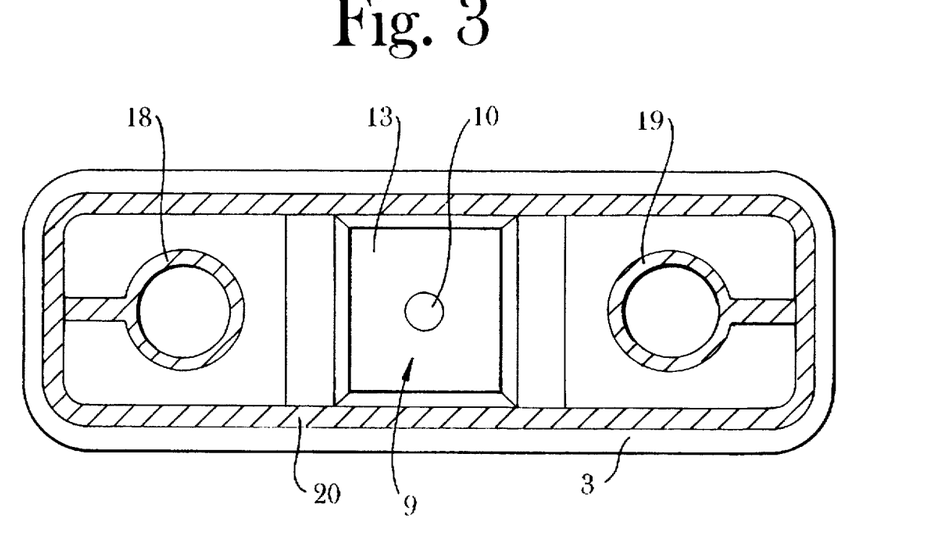
FIG. 3 is a view of the cover assembly of the accumulator from FIGS. 1 and 2 after injection welding of the seals from the inside of the accumulator.
Figure 4:
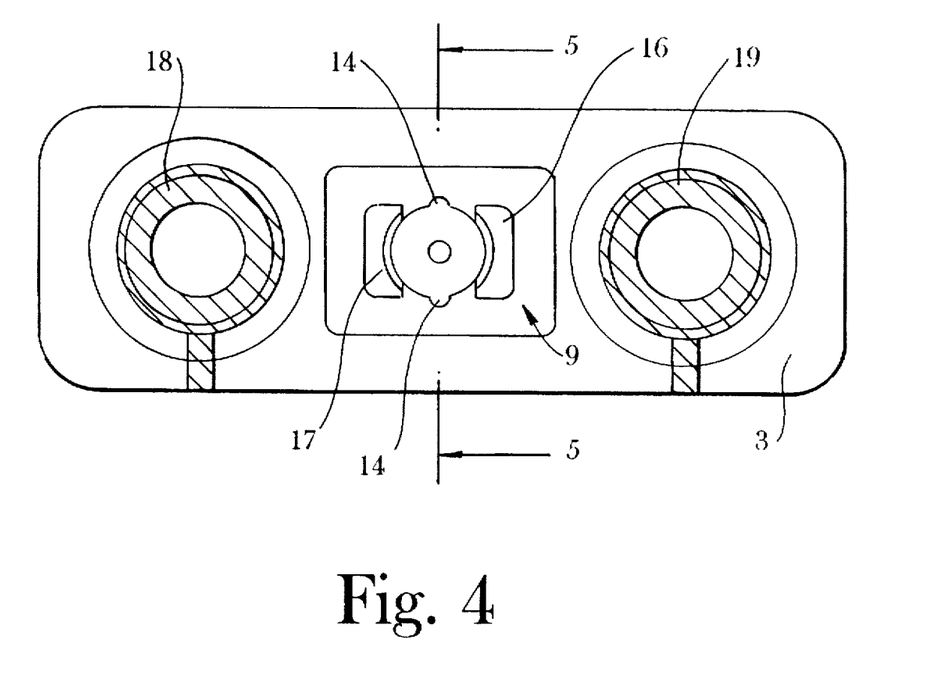
FIG. 4 is a view of the cover assembly of the accumulator from FIGS. 1 through 3 after the injection welding of the seals, from the front.

FIGS. 3 and 4 are a view on to the cover assembly from the front side and the rear side, of the valve 9 arranged in the cover 3. Also shown therein are the seals 18, 19 of the pole contacts 7, 8 and the seal 20 for sealing off the cover 3. The seals 18, 19 and 20 are each joined to the cover by hot-in-hot injection welding.

Figure 5:
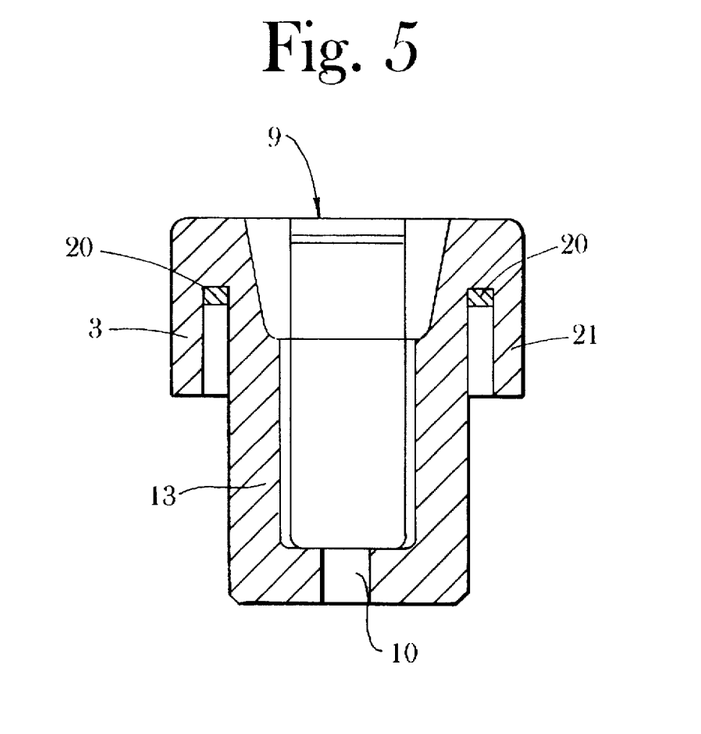
FIG. 5 is a view in cross-section taken along line A—A in FIG. 4 through the cover assembly.

The seal 20 for the cover 3, as shown in FIG. 5, is arranged in such a way that projecting lateral portions 21 of the cover 3 permit secure welding thereof to the remaining part of the casing 2.

Figures 7, 8:
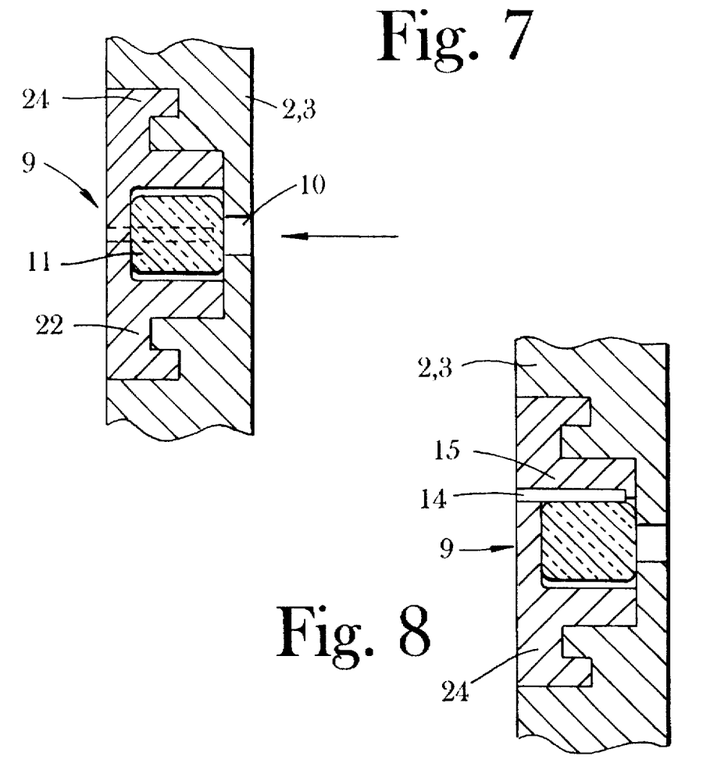
FIG. 7 is a view in cross-section through a valve assembly of a second embodiment according to the invention.
FIG. 8 is a view in cross-section through a valve assembly of a second embodiment according to the invention, but in a direction turned through 90° relative to the cross-section shown in FIG. 7.
Figure 9:
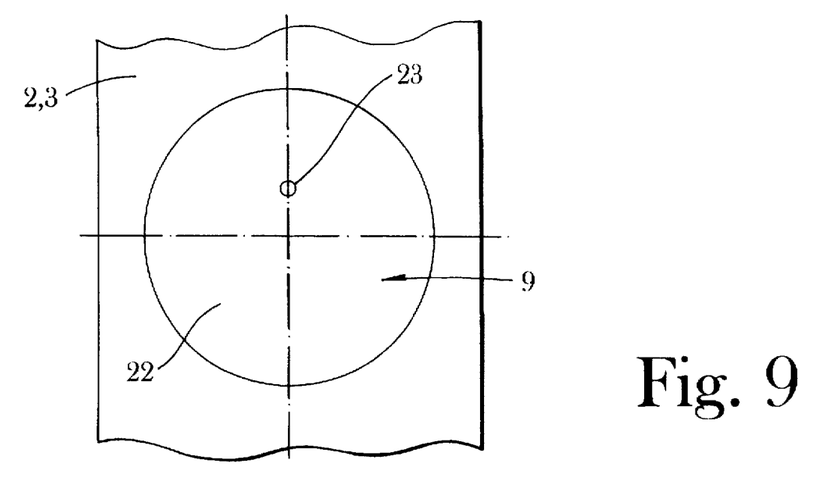
FIG. 9 is a view of the valve assembly shown in FIGS. 7 and 8, from the outside.

FIGS. 7, 8 and 9 show a second embodiment of the valve 9 according to the invention.

It is pointed out that, in all embodiments, the same components or components with the same action are denoted by the same references.

In this embodiment the deformable element 11 is arranged in a valve chamber 13 formed by a portion of the casing 2, in particular the cover 3, and a cover cap 22. The cover cap 22 laterally engages over the deformable element 11 and bears against the rear side thereof in such a way as to produce the above-described defined upsetting effect. The discharge passage 14 arranged in the wall 15 has a valve discharge opening 23 to the outside of the accumulator 1. In the radial direction, the cover cap has a lateral edge 24 which is wider in the outer end region and which is positively lockingly fitted into the casing 2, in particular the cover 3. In the region of the lateral edge 24 the cover cap 22 is connected to the casing 2, in particular the cover 3, by thermal welding or ultrasound welding.

As shown in FIG. 1, the valve 9 in the second embodiment and also the third embodiment described hereinafter can be arranged in the cover 3 between the pole contacts 7 and 8.

In an alternative configuration however the valve 9 of the second and third embodiments can be arranged at any other location, such as for example in the bottom 25 of the accumulator 1.

Figure 10:
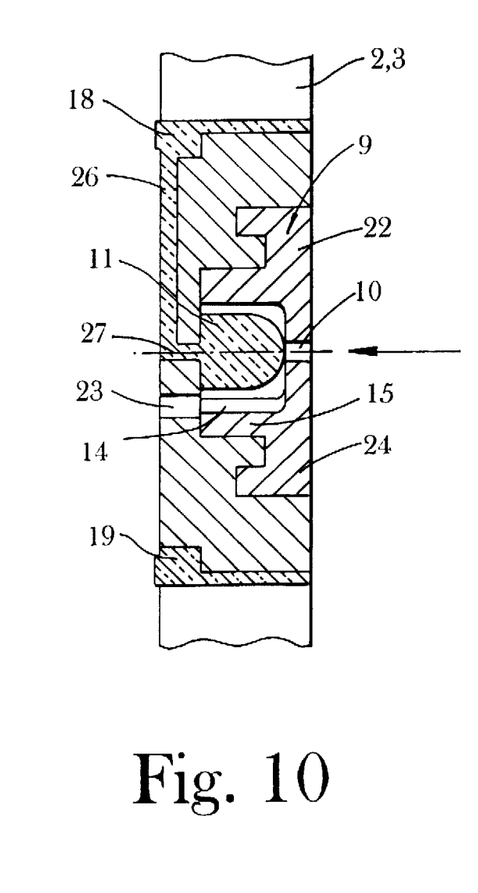
FIG. 10 is a view in cross-section through a third valve assembly according to the invention, in a third embodiment.
Figure 11:
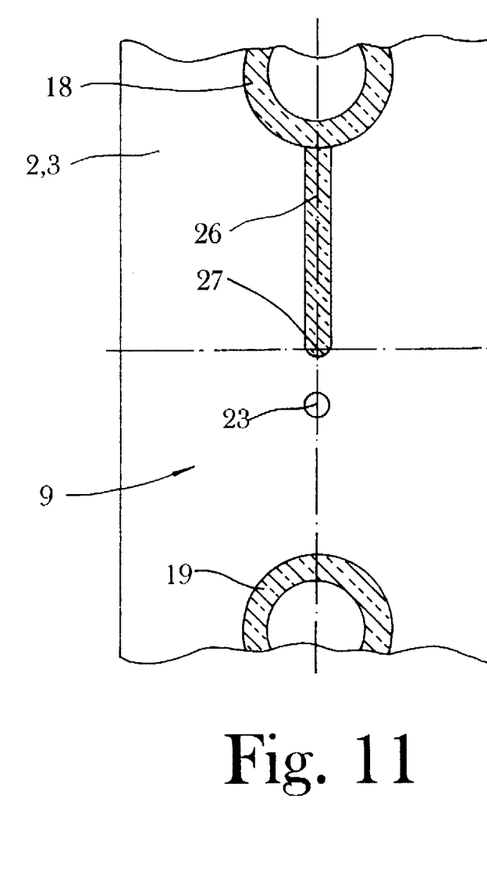
FIG. 11 is a view of the valve assembly shown in FIG. 10 from the outside.

The third embodiment according to the invention has a cover cap 22 in which the opening 10 is provided as in the preceding embodiment. The discharge opening 23 is provided in the casing 2, in particular in the cover 3. The cover cap 22 bears against the front side of the deformable element 11.

The deformable element 11 is produced by hot-in-hot injection welding together with the casing 2, in particular the cover 3. For that purpose a passage 26 connects the seals 18, 19 of the pole contacts 7, 8 to an opening 27 which permits the passage therethrough of the hot-injected plastic material, for producing the deformable element 11.

Depending on the respective arrangement of the valve 9, preferably the seals 18, 19 for the pole contacts 7, 8 and/or the seal 20 for the cover 3 are also formed in production of the deformable element 11.

Although the deformable element 11 can comprise any chemically resistance elastic material, when using the hot-in-hot injection welding procedure, thermoplastic elastomers, in particular modified polyamide, styrene-ethylene-butylene-styrene copolymer and/or polypropylene are preferred for that purpose. The plastic material of the deformable element is adjusted in terms of its hardness in such a way that it is in the range of known sealing materials, by virtue of the addition of plasticisers and/or by the selection of the degree of cross-linking thereof. The hardness of the plastic material of the casing 2 and in particular the cover 3 is so adjusted that it reaches the usual levels of casing strength.

In a further configuration, to improve the strength properties, glass, carbon, a carbon-reinforced plastic material, such as KEVLAR or boron fibre material is added embedded in the plastic material of the-casing 2, in particular the cover 3.

I claim:

1. A gas-tight alkaline accumulator comprising:
   a casing comprised at least partially of plastic material,
   electrodes arranged in said casing,
   a separator separating said electrodes,
   an electrolyte surrounding said electrodes,
   pole contacts connected to said electrodes for feeding electric current to and away from said electrodes,
   a valve (9) for reducing increased pressure occurring in said accumulator, said valve having an opening (10) leading through said casing (2, 3), and a deformable element (11) arranged to provide liberation of said opening (10) in the event an increased pressure occurs within said casing (2, 3) and for closing said opening (10) after said increased pressure falls, such that a predeterminable increased pressure for opening said valve (9) is produced by a defined upsetting of said deformable element (11).

2. The accumulator according to claim 1, wherein said deformable element (11) is arranged to bear forcibly and sealingly against said opening (10) by virtue of elasticity of said deformable element (11).

3. The accumulator according to claim 1, wherein said deformable element (11) is arranged to be supported opposite to said opening (10).

4. The accumulator according to claim 1, wherein said increased pressure that opens said opening (10) is between 2.5 and 10 bars.

5. The accumulator according to claim 4, wherein said increased pressure is 3.5 bars.

6. The accumulator according to claim 1, further comprising a discharge passage (14) arranged adjacent said deformable element (11), which discharge passage (14) extends within a wall (15) arranged beside said deformable element (11).

7. The accumulator according to claim 1, further comprising a valve chamber (13) within which said deformable element (11) is arranged with lateral clearance, and a retaining element (12) for holding said deformable element (11) at a rear side of said deformable element (11) within said valve chamber (13).

8. The accumulator according to claim 1, further comprising a cup-shaped cover cap (22) engaging laterally with said deformable element (11) and contacting and bearing against said deformable element (11) on a rear side of said deformable element (11), said cover cap (22) having a valve discharge opening (23).

9. The accumulator according to claim 1, further comprising a cup-shaped cover cap (22) engaging laterally with said deformable element (11) and contacting and bearing against said deformable element (11) on a rear side of said deformable element (11), said cover cap having an end portion in which said opening (10) is arranged, said casing (2, 3) having a valve discharge opening (23).

10. The accumulator according to claim 8, wherein said cover cap (22) has a lateral edge (24) that is wider in an outer end region.

11. The accumulator according to claim 1, wherein said valve (9) is arranged in a cover (3) of said accumulator.

12. The accumulator according to claim 1, wherein said valve (9) is arranged between said pole contacts (7, 8).

13. The accumulator according to claim 1, wherein said accumulator (1) comprises a prismatic accumulator.

14. The accumulator according to claim 13, wherein said accumulator (1) comprises a rectangular accumulator.

15. The accumulator according to claim 1, wherein said deformable element has been hot-in-hot injection welded at least into a part of said casing (2, 3).

16. The accumulator according to claim 15, wherein said deformable element (11) has been hot-in-hot injection welded simultaneously with seals (18, 19, 20) of said casing (2, 3).

17. The accumulator according to claim 15, wherein said deformable element (11) has been hot-in-hot injection welded simultaneously with a cover seal (20).

18. The accumulator according to claim 15, wherein said deformable element (11) has been hot-in-hot injection welded simultaneously with pole contact seals (18, 19).

19. The accumulator according to claim 1, wherein at least a part of said casing (2) and said deformable element (11) comprise a thermoplastic elastomer.

20. The accumulator according to claim 19, wherein said thermoplastic elastomer is selected from the group consisting of modified polyamide, styrene-ethylene-butylenestyrene copolymer and polypropylene.

21. The accumulator according to claim 19, wherein said casing (2) and said deformable element (11) are of different hardnesses.

22. The accumulator according to claim 1, wherein said casing includes material selected from the group consisting of glass, carbon, carbon-reinforced plastic material, and boron fibers embedded in said plastic material.

* * * * *